United States Patent Office 3,373,397
Patented Mar. 12, 1968

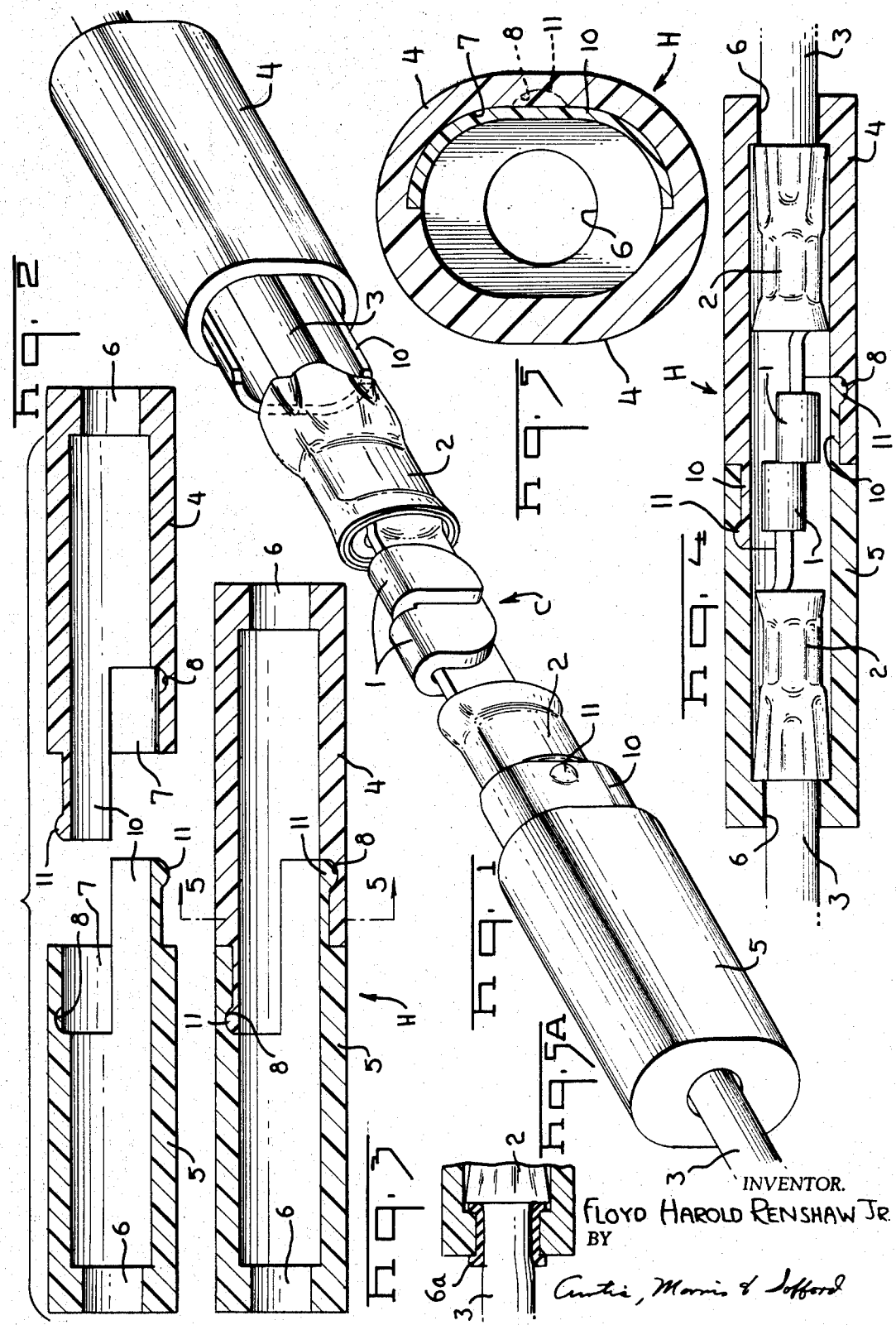

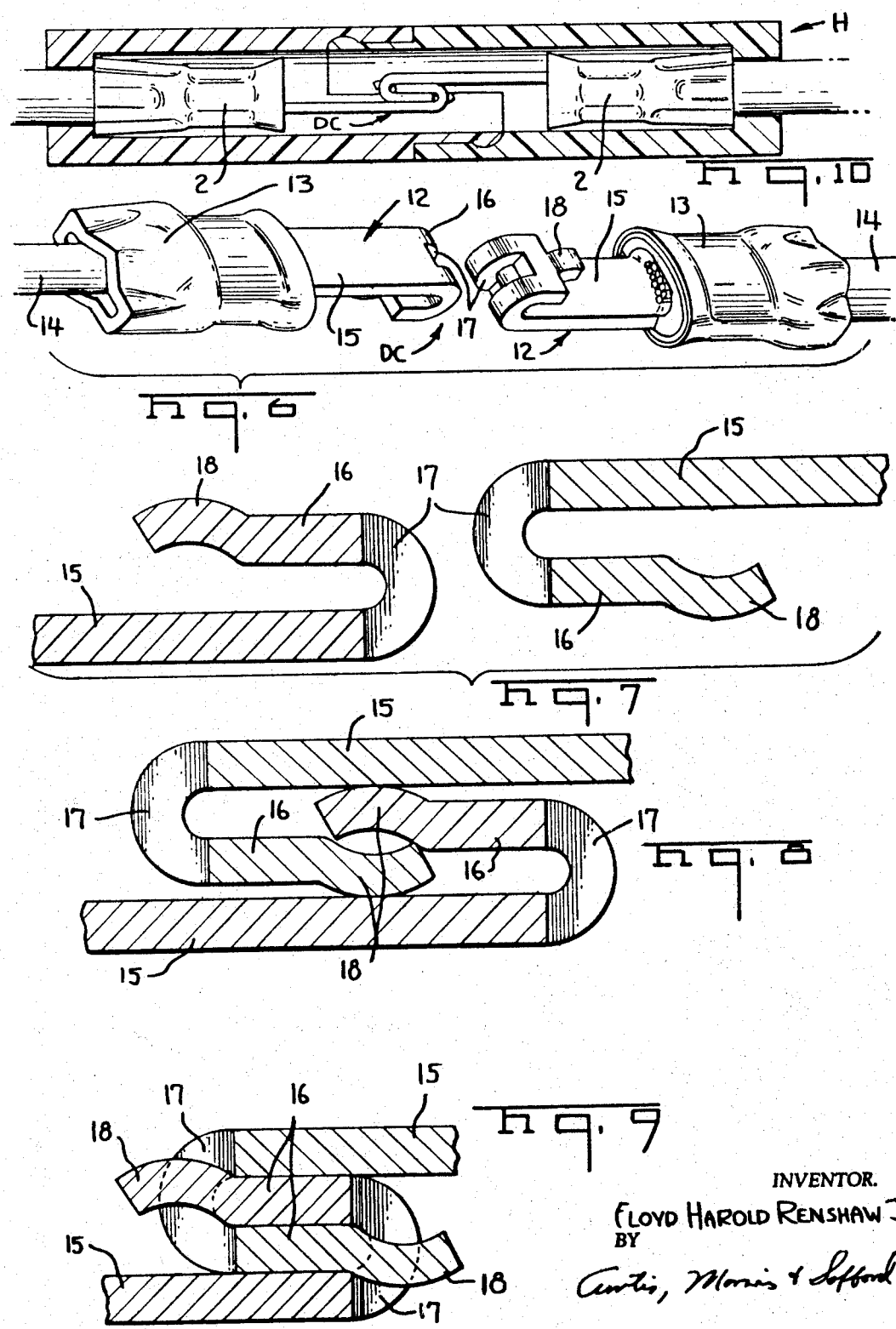

3,373,397
ELECTRICAL CONNECTOR AND INSULATION HOUSING THEREFOR
Floyd Harold Renshaw, Jr., Hershey, Pa., assignor to AMP Incorporated, Harrisburg, Pa.
Filed Oct. 6, 1965, Ser. No. 493,380
2 Claims. (Cl. 339—47)

ABSTRACT OF THE DISCLOSURE

An insulation housing having identical parts each provided with an arcuate shaped recess along an interior surface of one end and an arcuate shaped extension extending outwardly from this one end. The extensions mate with the recesses when the housing parts are interconnected and means are located in the recesses and on the extensions to latch the parts together to surround and insulate an electrical connection within the housing.

This invention relates to an electrical connector of the disconnect type and an insulation housing therefor.

In the field of disconnect connectors of the type disclosed in U.S. Patent No. 2,478,143, these connectors have been or can be insulated by pulling a tube of flexible material over the connection, wrapping insulation tape over the connection, placing a shrinkable plastic member over the connection and shrinking it in place thereon or insulation may be applied to the connection in the form of flowable or sprayable dielectric material. As can be discerned, it is difficult to apply the foregoing types of insulation to the connection; and, once these types of insulation have been applied to the connection, the insulation has to be destroyed in order to disconnect the connection or it is difficult to remove the tube of flexible material from the connection as well as reapply it thereover. If the insulation has to be destroyed in order to disconnect the connection, then insulation will have to be reapplied to the connection when it is reconnected.

It is therefore a primary object of the invention to provide an insulation housing that obviates the disadvantages of the conventional types of insulation to be applied to a disconnect connection or the like.

Another object of the invention is to provide an insulation housing for an electrical connection that is easily applied thereto and permits ready access to the connection.

A further object of the invention is the provision of an insulation housing that is simple in construction and economical to manufacture.

An additional object of the invention is to provide a disconnect connector that can be used in conjunction with the insulation housing.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing objects are achieved by means of an insulation housing having identical parts each provided with an arcuate-shaped recess in one end and an arcuate-shaped extension extending outwardly from the one end, the extensions mating with the recesses, and means are located in the recesses and on the extensions to latch the parts together to surround and insulate an electrical connection. The disconnect connector comprises identical or hermaphroditic parts, each part including a U-shaped section having an arcuate opening at the bight thereof and a detent-latching member at the end of the free leg, the free legs being disposable within the U-shaped sections and the detent-latching members being matable with the arcuate openings to latch the parts together. The above-mentioned housing is, of course, usable on the foregoing disconnect connector.

In the drawings:

FIGURE 1 is a perspective view of a disconnect connector in a connected position and having an insulation housing movably mounted on the conductor means and disposed in a non-connected position;

FIGURE 2 is an exploded cross-sectional view of the insulation housing;

FIGURE 3 is a view similar to FIGURE 2 but with the parts of the insulation housing in a mated position;

FIGURE 4 is a view similar to FIGURE 1 but showing the parts of the insulation housing in position in the manner illustrated in FIGURE 3;

FIGURE 5 is a view taken along lines 5—5 of FIGURE 3; and

FIGURE 5a is a fragmentary cross-sectional view illustrating an embodiment of the housing.

Turning now to the drawings and more particularly FIGURES 1 through 5, there is illustrated a disconnect connector C of the type disclosed in U.S. Patent No. 2,478,143 including matable connector elements 1 having ferrule sections 2 crimped onto conductor members 3. Insulative housing member H comprises parts 4 and 5 which are of identical configuration. Housing member H is made from a suitable plastic material; such as for example, nylon, polypropylene, etc. Parts 4 and 5 are preferably manufactured by conventional molding techniques; and since each part is identical, the cost of the mold for a housing member is substantially reduced. In selecting the material to mold the housing member, it is important that it be relatively firm and hard after the molding operation has been performed in order that the parts of the housing member have stiffly-flexible characteristics.

Each of parts 4 and 5 is a hollow tubular member having an oblong exterior configuration as well as a similar interior configuration. An opening 6 is disposed in one end of the parts to accommodate conductor members 3. A grommet 6a of flexible material can be disposed in openings 6 to snugly engage conductor members 3 to form a seal therebetween as illustrated in FIGURE 5a. An arcuate recess 7 is disposed in the other end of each part and an indentation 8 is located in arcuate recess 7. An arcuate-shaped extension 10 extends outwardly from the same end containing arcuate recess 7 and includes a projection 11 on the exterior surface thereof. Arcuate recess 7 extends along one-half or about one-half of the interior circumference of the parts while arcuate-shaped extension 10 extends along the other half or the remainder of the interior circumference. The length of arcuate recess 7 is also the same length as arcuate-shaped extension 10 so that arcuate-shaped extensions 10 and projections 11 of parts 4 and 5 are matable with arcuate recesses 7 and indentations 8 of parts 4 and 5 in order to form insulative housing member H to surround and encompass disconnect connector C in its connected condition as illustrated in FIGURE 4.

This provides an insulated connection to allow the connection to be readily disconnected by disengaging parts 4 and 5 of the housing member and rotating the matable connector elements toward each other until they become disconnected and then outwardly from each other to complete the disconnection of the connector elements from each other. With the housing member in place around connector C as illustrated in FIGURE 4, housing member H also serves to prevent connector elements 1 from becoming disconnected by preventing them from being rotated toward each other to disconnect same. It is understood that parts 4 and 5 are inserted onto conductor members 3 prior to connector elements 1 being connected to the conductor members especially when the ends of conductor members 3 remote from connector elements 1 are connected to something thereby preventing parts 4 and 5 from being inserted onto conductor members 3 unless they are inserted thereon prior to connector elements 1 being connected onto the ends of the conductor members. More than one projection 11 can be located on extensions 10 to mate with the respective number of indentations 8 within recesses 7 to form the latching means to latch the parts of housing member H together. The exterior and interior configurations of the parts of housing member H can take any desirable form other than oblong configurations.

As can be discerned, there has been disclosed a unique insulative housing member to insulate a disconnect connector as well as a novel disconnect connector on which the insulative housing member is also used to insulate the connector.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. An electrical connector assembly comprising in combination a disconnect connector and an insulative housing member of stiffly-flexible material; said disconnect connector including identical matable elements having first sections secured to conductor members and second sections engageable with each other to form an electrical connection; said insulative housing member including identical tubular parts, each of said parts having an opening at one end through which a conductor member extends, an arcuate recess on an interior surface at the other end and an arcuate extension extending outwardly from this other end, said arcuate extensions being matable within said arcuate recesses to encompass said electrical connection and provide insulation therefor, and latching means between said extensions and said recesses to latch said parts together wherein said latching means include projections to one of said extensions and recesses matable with indentations in one of said extensions and recesses.

2. An electrical connector assembly according to claim 1 wherein sealing means are disposed within said openings of said tubular parts which sealingly engage said conductor members.

References Cited
UNITED STATES PATENTS

| | | | |
|---|---|---|---|
| 366,654 | 7/1887 | Duby et al. | 339—47 X |
| 2,171,726 | 9/1939 | Howell | 339—47 |
| 2,626,299 | 1/1953 | Richards | 339—47 |
| 2,738,477 | 3/1956 | Matthysee | 339—47 |
| 2,755,449 | 7/1956 | Anderson | 339—47 |
| 2,838,739 | 6/1958 | Winkler | 339—47 |
| 2,891,103 | 6/1959 | Swengel | 339—126 |
| 3,154,359 | 10/1964 | Farber | 339—49 X |

MARVIN A. CHAMPION, *Primary Examiner.*

PATRICK A. CLIFFORD, *Examiner.*